United States Patent
Nagata et al.

(10) Patent No.: US 10,069,651 B2
(45) Date of Patent: *Sep. 4, 2018

(54) RADIO COMMUNICATION SYSTEM THAT FEEDS BACK CHANNEL STATE INFORMATION (CSI)

(71) Applicant: NTT DOCOMO, INC., Tokyo (JP)

(72) Inventors: Satoshi Nagata, Tokyo (JP); Yang Song, Beijing (CN); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 15/065,081

(22) Filed: Mar. 9, 2016

(65) Prior Publication Data

US 2016/0191273 A1  Jun. 30, 2016

Related U.S. Application Data

(63) Continuation of application No. 14/426,321, filed as application No. PCT/JP2013/070784 on Jul. 31, 2013, now Pat. No. 9,319,120.

(30) Foreign Application Priority Data

Sep. 7, 2012 (JP) ................................. 2012-197745

(51) Int. Cl.
*H04L 25/02* (2006.01)
*H04W 16/28* (2009.01)
(Continued)

(52) U.S. Cl.
CPC ....... *H04L 25/0224* (2013.01); *H04B 7/0452* (2013.01); *H04B 7/0456* (2013.01);
(Continued)

(58) Field of Classification Search
CPC .. H04B 7/0452; H04B 7/0456; H04B 7/0626; H04L 5/0023; H04L 5/0048; H04W 16/28; H04W 88/08
See application file for complete search history.

(56) References Cited

U.S. PATENT DOCUMENTS 8,396,143 B2  3/2013  Kim et al.
8,750,933 B2  6/2014  Song et al.
(Continued)

FOREIGN PATENT DOCUMENTS

| JP | 2011-522462 A | 7/2011 |
| WO | 2011/115421 A2 | 9/2011 |
| WO | 2013/024852 A1 | 2/2013 |

OTHER PUBLICATIONS

Alcatel-Lucent: "Considerations on CSI feedback enhancements for high-priority antenna configurations", 3GPP TSG-RAN WG1 #66 R1-112420, 3GPP, Aug. 22, 2011.*
(Continued)

*Primary Examiner* — Mewale Ambaye
(74) *Attorney, Agent, or Firm* — Osha Liang LLP

(57) ABSTRACT

The present invention is designed so that it is possible to feed back channel state information (CSI) that is suitable for downlink communication in which 3D beams are used. The radio communication method of the present invention is a radio communication method to allow a radio base station to carry out downlink communication with a user terminal by using a 3D beam that is formed with a horizontal beam having directivity in a horizontal plane and a vertical beam having directivity in a vertical plane, and has the steps in which the radio base station transmits a plurality of measurement reference signals that are pre-coded using different precoding weights between a plurality of vertical beams, and the user terminal transmits channel state information that is (Continued)

generated based on the plurality of measurement reference signals, to the radio base station.

3 Claims, 18 Drawing Sheets

(51) Int. Cl.
*H04B 7/0452* (2017.01)
*H04B 7/0456* (2017.01)
*H04B 7/06* (2006.01)
*H04W 88/08* (2009.01)
*H04L 5/00* (2006.01)

(52) U.S. Cl.
CPC .......... *H04B 7/0626* (2013.01); *H04W 16/28* (2013.01); *H04L 5/0023* (2013.01); *H04L 5/0048* (2013.01); *H04W 88/08* (2013.01)

(56) References Cited

U.S. PATENT DOCUMENTS

| | | |
|---|---|---|
| 8,825,069 B2 | 9/2014 | Koivisto et al. |
| 2010/0202308 A1* | 8/2010 | Gorokhov ............ H04B 7/0417 370/252 |
| 2012/0106610 A1* | 5/2012 | Nogami ................. H04B 7/024 375/224 |
| 2012/0113816 A1* | 5/2012 | Bhattad ................. H04L 5/0032 370/246 |
| 2012/0281783 A1* | 11/2012 | Cheng .................. H04B 7/0456 375/295 |
| 2012/0287875 A1* | 11/2012 | Kim ....................... H04B 7/024 370/329 |
| 2014/0003240 A1 | 1/2014 | Chen et al. |
| 2014/0211731 A1 | 7/2014 | Inoue et al. |
| 2015/0080046 A1 | 3/2015 | Liu et al. |

OTHER PUBLICATIONS

Office Action issued in corresponding Japanese Application No. 2012-197745, dated Oct. 18, 2016 (5 pages).
International Search Report issued in PCT/JP2013/070784 dated Oct. 15, 2013 (2 pages).
Alcatel-Lucent Shangai Bell et al.; "Considerations on CSI feedback enhancements for high-priority antenna configurations"; 3GPP TSG-RAN WG1 #66, R1-112420; Athens, Greece; Aug. 22-26, 2011 (7 pages).
3GPP TR 25.913 V8.0.0; "3rd Generation Partnership Project; Technical Specification Group Radio Access Network; Requirements for Evolved UTRA (E-UTRA); and Evolved UTRAN (E-UTRAN) (Release 8)"; Dec. 2008 (18 pages).

* cited by examiner

MAPPING OF CRS (SUBFRAME WITH NORMAL CP)

ILLUSTRATION OF PMI IN 3D CHANNEL

ILLUSTRATION OF PMI IN 2D CHANNEL

ALT. 1.2 (PRECODED CSI-RS)

ALT. 1.3 (PRECODED CSI-RS)

ALT. 2.1 (PRECODED CRS)

RADIO COMMUNICATION SYSTEM THAT FEEDS BACK CHANNEL STATE INFORMATION (CSI)

CROSS-REFERENCE TO RELATED APPLICATIONS

The present application is a continuation application of and, thereby, claims benefit under 35 U.S.C. § 120 to U.S. patent application Ser. No. 14/426,321 filed on Mar. 5, 2015, titled, "RADIO COMMUNICATION METHOD, USER TERMINAL, RADIO BASE STATION AND RADIO COMMUNICATION SYSTEM," now U.S. Pat. No. 9,319,120, which is a national stage application of PCT Application No. PCT/JP2013/070784, filed on Jul. 31, 2013, which claims priority to Japanese Patent Application No. 2012-197745 filed on Sep. 7, 2012. The contents of the priority applications are incorporated by reference in their entirety.

TECHNICAL FIELD

Embodiments of the invention relate to a user terminal in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) SC-FDMA (Single Carrier Frequency Division Multiple Access) is used on in uplink channels (uplink).

In LTE, MIMO (Multi Input Multi Output), which achieves improved data rates (spectral efficiency) by transmitting and receiving data using a plurality of antennas, is defined. In MIMO, a plurality of transmitting/receiving antennas are provided in the transmitter/receiver, so that different information sequences are transmitted from different transmitting antennas at the same time. Meanwhile, on the receiving side, taking advantage of the fact that fading variation is produced differently between the transmitting/receiving antennas, information sequences that have been transmitted at the same time are separated and detected.

As MIMO transmission schemes, single-user MIMO (SU-MIMO), in which transmission information sequences for the same user are transmitted at the same time from different transmitting antennas, and multi-user MIMO (MU-MIMO), in which transmission information sequences for different users are transmitted at the same time from different transmitting antennas, have been proposed. In SU-MIMO and MU-MIMO, optimal PMIs (Precoding Matrix Indicators) to match the amount of phase and amplitude control (precoding weights) to be set in the antennas are selected from codebooks, and fed back to the transmitter as channel state information (CSI). On the transmitter side, each transmitting antenna is controlled based on the CSI fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF INVENTION

Also, successor systems of LTE (referred to as, for example, "LTE-advanced" or "LTE enhancement" (hereinafter referred to as "LTE-A")) are under study for the purpose of achieving further broadbandization and increased speed beyond LTE. In this LTE-A, a study is also in progress to carry out downlink communication (for example, MIMO transmission) by using 3D beams that have directivity in the vertical plane in addition to the horizontal plane. Consequently, realization of a feedback scheme for channel state information (CSI) that is suitable for downlink communication using 3D beams is awaited.

The present invention has been made in view of the above, and it is therefore an object of the present invention to provide a radio communication method, a user terminal, a radio base station and a radio communication system that can feed back channel state information (CSI) that is suitable for downlink communication using 3D beams.

The radio communication method of the present invention is a radio communication method to allow a radio base station to carry out downlink communication with a user terminal by using a 3D beam that is formed with a horizontal beam having directivity in a horizontal plane and a vertical beam having directivity in a vertical plane, and this radio communication method includes the steps in which the radio base station transmits a plurality of measurement reference signals that are pre-coded using different precoding weights between a plurality of vertical beams, and the user terminal transmits channel state information that is generated based on the plurality of measurement reference signals, to the radio base station.

According to the present invention, it is possible to feed back channel state information (CSI) that is suitable for downlink communication using 3D beams.

DESCRIPTION OF EMBODIMENTS

Now, measurement reference signals to be used for channel state information (CSI) feedback (hereinafter referred to as "CSI feedback") in the LTE system and the LTE-A system will be described with reference to FIG. 1 and FIG. 2. For the measurement reference signals, CRSs (Common Reference Signals) and CSI-RSs (CSI-Reference Signals) and so on are used.

CRSs are measurement reference signals that were introduced in Rel-8 for the purposes of CSI feedback, cell search and so on. CRS signal sequences are pseudo-random sequences, and are subjected to QPSK modulation. QPSK-modulated CRSs are mapped to a plurality of resource elements (REs) in accordance with predetermined rules. Note that CRSs are not user-specific reference signals like DMRSs (DeModulation Reference Signals), but are cell-specific reference signals, and therefore are not pre-coded.

Figure 1:
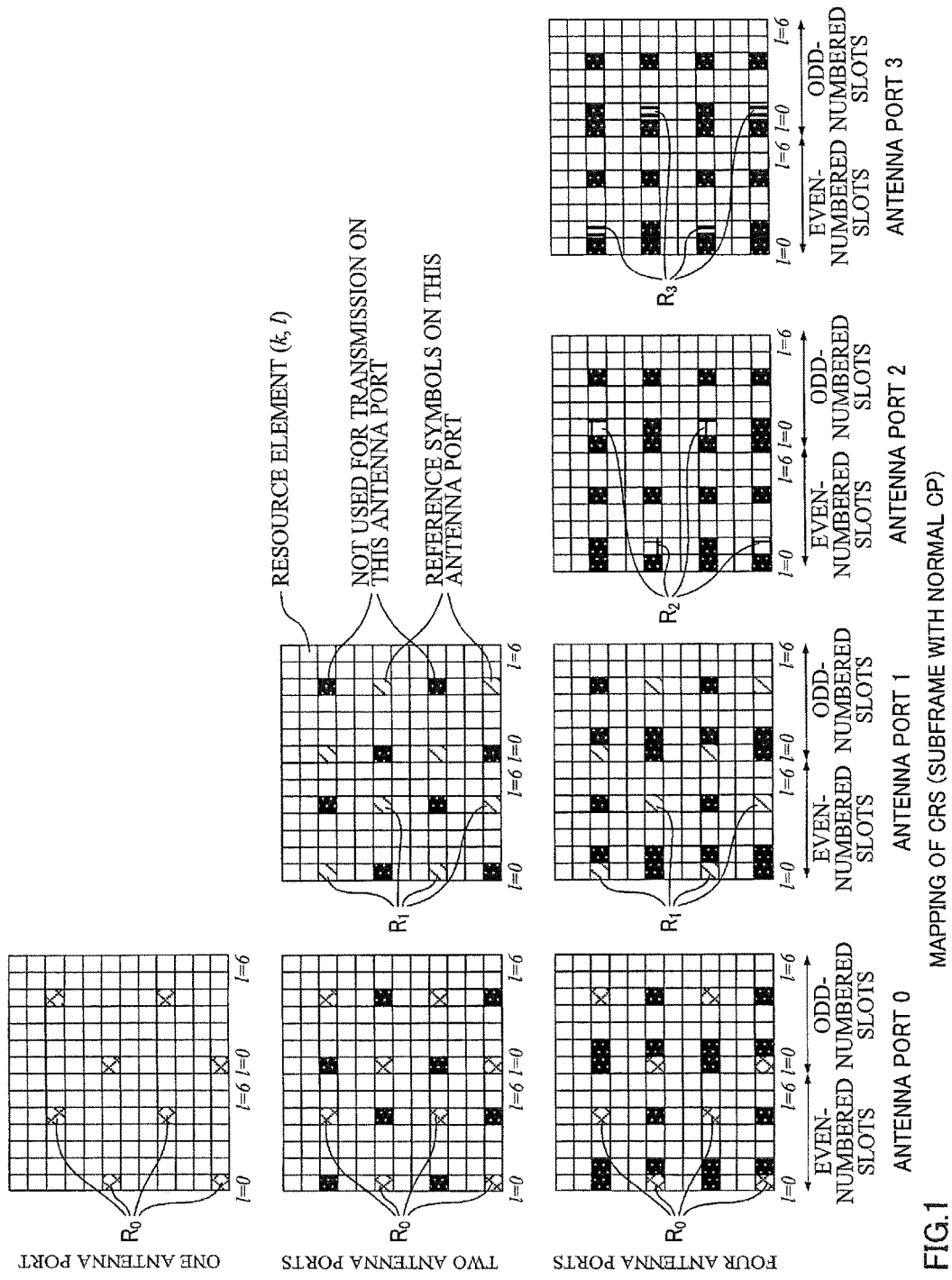
FIG. 1 is a diagram to show examples of mapping of CRSs.

FIG. 1 is a diagram to show examples of mapping of CRSs when the number of antenna ports is one, two and four. As shown in FIG. 1, CRSs of maximum four antenna ports (which are numbered 0 to 3) are supported, so that channel estimation for maximum four channels can be carried out in a user terminal UE. The CRSs ($R_0$ to $R_3$) of each antenna port are mapped to mutually different resource elements (REs), and are orthogonally-multiplexed by time division multiplexing (TDM)/frequency division multiplexing (FDM).

Meanwhile, CSI-RSs are measurement reference signals that were introduced in Rel-10 for the purpose of CSI feedback. CSI-RS signal sequences are pseudo-random sequences and subjected to QPSK modulation. QPSK-modulated CSI-RSs are mapped to CSI-RS resources. Note that CSI-RSs are not pre-coded either.

Figure 2:
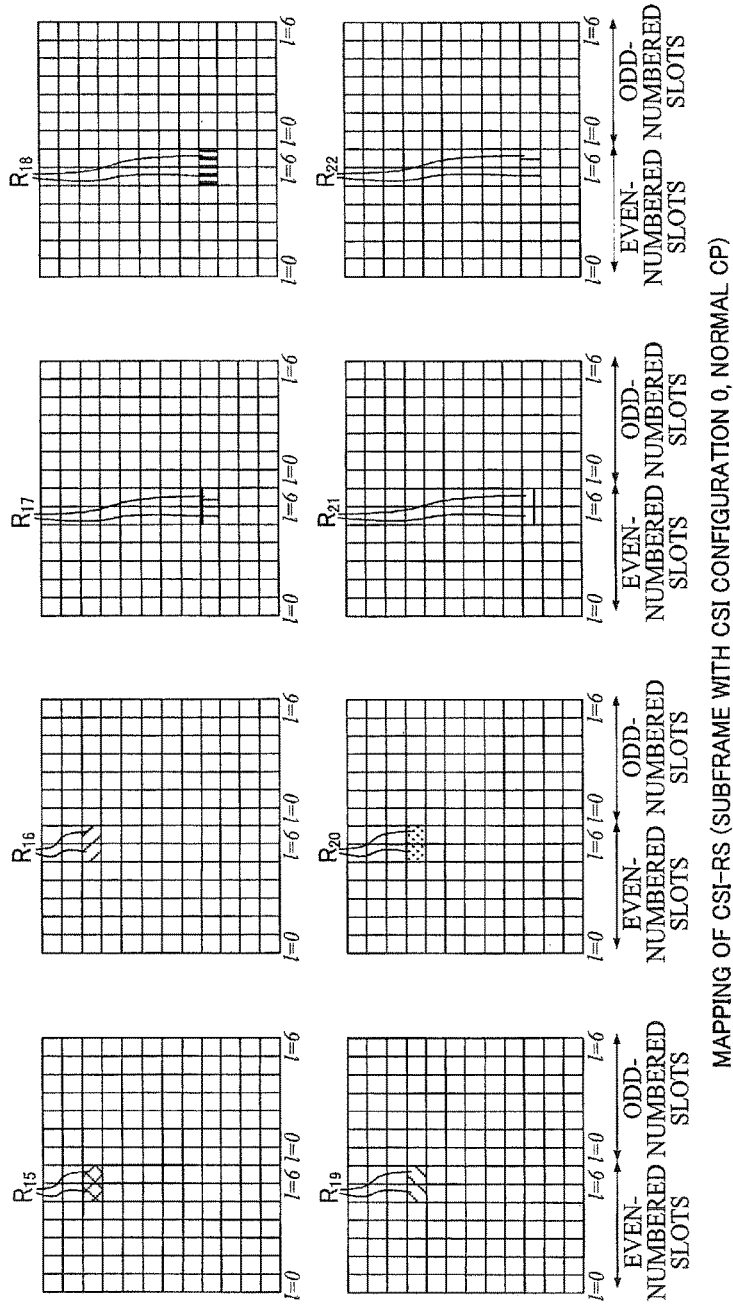
FIG. 2 is a diagram to show examples of mapping of CSI-RSs.

FIG. 2 is a diagram to show examples of mapping of CSI-RSs. As shown in FIG. 2, CSI-RSs of maximum eight antenna ports (which are numbered 15 to 22) are supported, so that channel estimation for maximum eight channels can be carried out in a user terminal UE. The CSI-RSs ($R_{15}$ to $R_{22}$) of each antenna port are orthogonally-multiplexed by time division multiplexing (TDM)/frequency division multiplexing (FDM)/code division multiplexing (CDM).

For example, in FIG. 2, the CSI-RSs of the antenna ports 15 and 16 ($R_{15}$ and $R_{16}$) are mapped to the same resource elements (REs) and code-division-multiplexed (CDM). The same holds with the CSI-RSs of the antenna ports 17 and 18 ($R_{17}$ and $R_{18}$), the CSI-RSs of the antenna ports 19 and 20 ($R_{19}$ and $R_{20}$) and the CSI-RSs of the antenna ports 21 and 22 ($R_{21}$ and $R_{22}$).

Note that, although FIG. 2 illustrates a case where the number of antenna ports is eight, the CSI-RSs when the number of antenna ports is one, two and four are supported as well. In such cases, a nest structure is employed, so that the CSI-RS of each antenna port are mapped to even a larger number of resource elements (REs).

Also, in Rel-11 CoMP, a plurality of CSI processes are provided in association with a plurality of CoMP cells, respectively. CSI-RS resources are provided and CSI feedback is sent, for each of these CSI processes. Also, for each CSI process, a CSI configuration, which shows the arrangement pattern of CSI-RS resources (in FIG. 2, CSI configuration 0), is defined.

Figure 3:
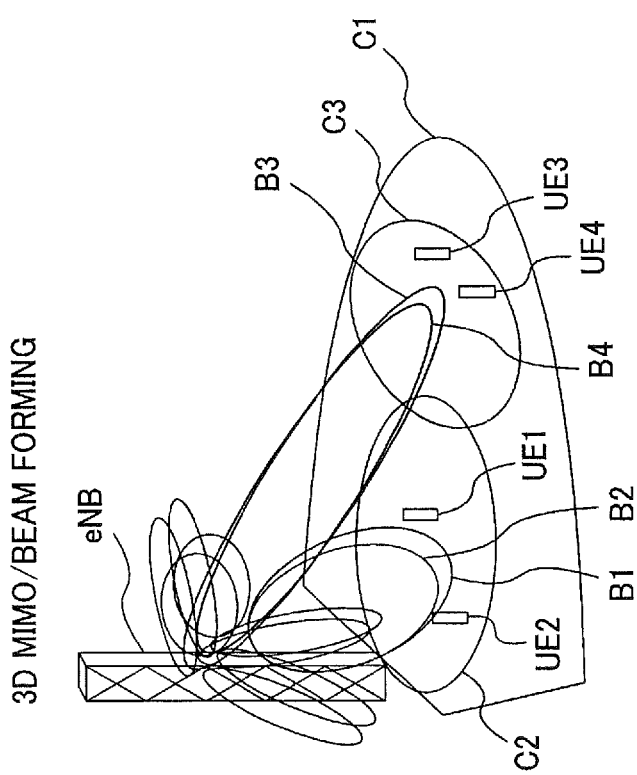
FIG. 3 is a diagram to explain a communication scheme (3D MIMO/beam forming) that may be applied to an LTE-A system.

Now, 3D beam forming will be described with reference to FIG. 3. FIG. 3 is a conceptual diagram of MIMO transmission in which 3D beam forming is used. As shown in FIG. 3, in MIMO transmission using 3D beam forming, 3D beams having directivity in the vertical plane in addition to the horizontal plane are output from the transmitting antennas of the radio base station eNB. By means of 3D beams having varying directivities in the vertical direction, the cell C1 of the radio base station eNB is sectorized into an inner cell C2 and an outer cell C3.

In FIG. 3, the radio base station eNB outputs 3D beams B1 and B2 to user terminals UE1 and UE2 located in the inner cell C2, respectively, and carries out downlink MIMO transmission. Meanwhile, the radio base station eNB outputs 3D beams B3 and B4 to user terminals UE3 and UE4 located in the outer cell C3, respectively, and carries out downlink MIMO transmission. These 3D beams are made possible by means of 3D antennas.

In 3D beam forming, it might occur that, compared to 2D beam forming, the number of transmitting antenna elements (Tx antenna elements) provided in the radio base station eNB increases significantly. FIG. 4 shows schematic views of a 2D antenna and a 3D antenna.

Figure 4B:
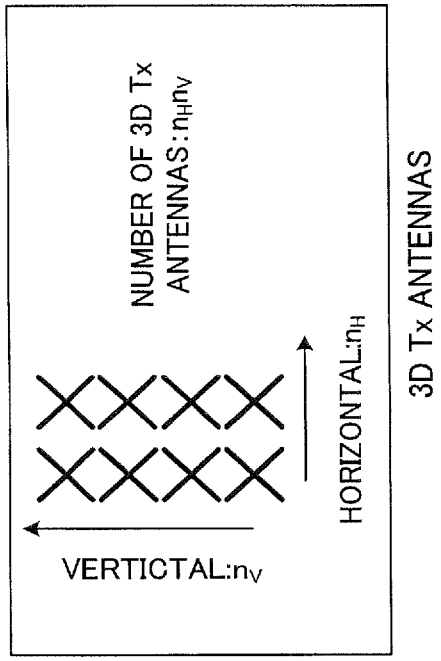
FIGS. 4A and 4B provide diagrams to show schematic views of a 2D antenna and a 3D transmitting antenna.
Figure 4A:
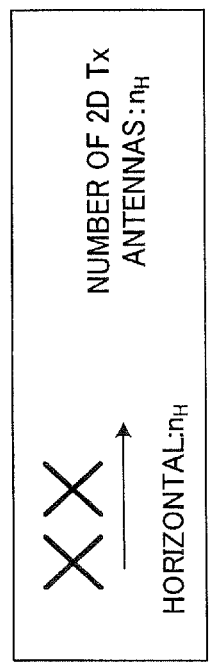

FIG. 4A shows a schematic view of a 2D antenna, and FIG. 4B shows a schematic view of a 3D antenna. As shown in FIG. 4A, a 2D antenna is formed with a plurality of antenna elements (4Tx) that are provided along the horizontal direction. As shown in FIG. 4B, a 3D antenna is formed with a plurality of antenna elements (4Tx) that are provided along the horizontal direction, and a plurality of antenna elements (4Tx) that are provided along the vertical direction. That is, the number of antenna elements ($n_H$) constituting the 2D antenna is four (four in one row), and the number of antenna elements ($n_H$ $n_V$) constituting the 3D antenna is sixteen (four in one row and four in one column).

Now, PMIs in 2D channels used in 2D beam forming and 3D channels used in 3D beam forming will be described with reference to FIG. 5. FIG. 5A shows PMIs in a 2D channel (conventional PMIs), and FIG. 5B shows the $PMI_H$'s of horizontal domains (horizontal planes) in a 3D channel when the present embodiment is employed.

Figure 5B:
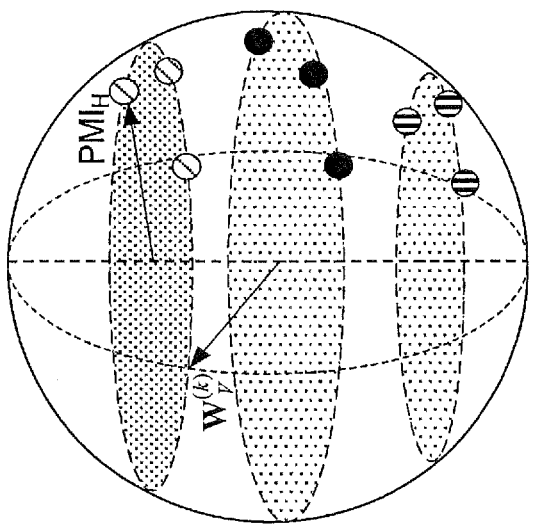
FIGS. 5A and 5B provide diagrams to explain PMIs in 2D channels and 3D channels.
Figure 5A:

In FIG. 5B, each vertical beam (for example, the k-th vertical beam ($W_v^{(k)}$)) forms the horizontal domain channel (horizontal channel) corresponding to that vertical beam, and the $PMI_H$ of that channel is shown. That is, a $PMI_H$ is equivalent to a 2D channel PMI. In the case illustrated in FIG. 5B, from the user terminal UE side, it is possible to see the 3D channel as the state of a 2D horizontal channel corresponding to a predetermined vertical beam, by precoding of measurement reference signals.

Figures 6A, 6B:
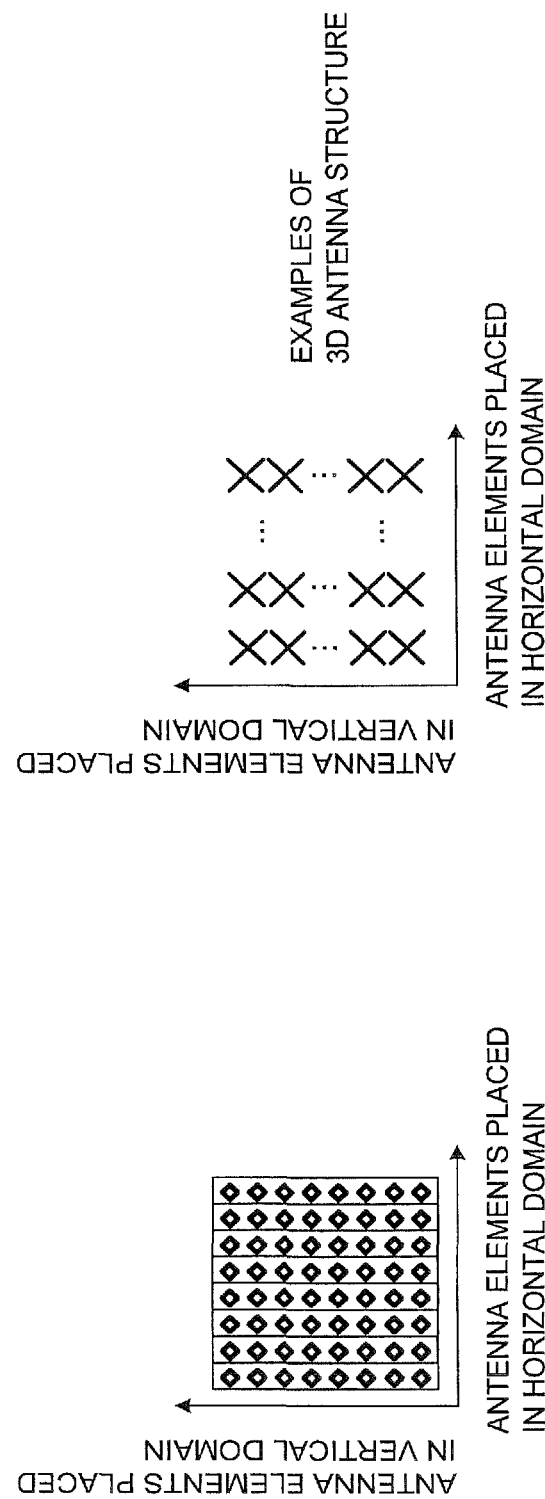
FIGS. 6A and 6B provide diagrams to explain examples of 3D antenna structures.

Next, an example of a 3D antenna structure will be described with reference to FIG. 6. To realize 3D beam forming/3D MIMO, a plurality of antenna elements need to be placed in both the horizontal domain (horizontal plane) and the vertical domain (vertical plane). FIG. 6 shows examples of 3D antenna structures. FIG. 6A shows a case where antenna elements that are designed on a reduced scale are placed along the horizontal domain and the vertical domain, and FIG. 6B shows a cross-polarized antenna, in which antenna elements are placed to cross one another in the horizontal domain and the vertical domain.

Figure 7C:
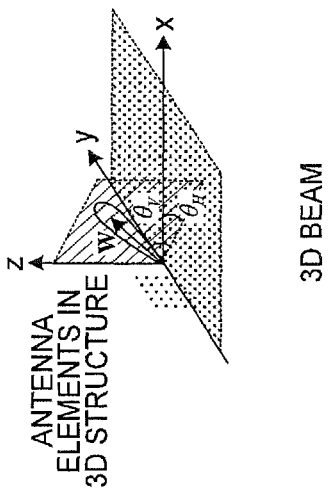
FIGS. 7A, 7B, and 7C provide diagrams to explain a horizontal beam/a vertical beam/a 3D beam.
Figure 7B:
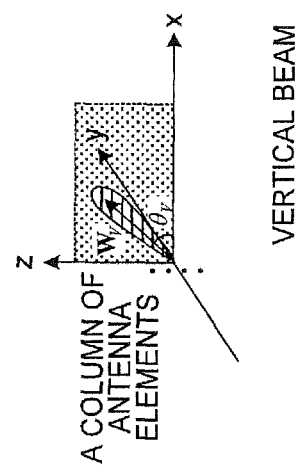
Figure 7A:
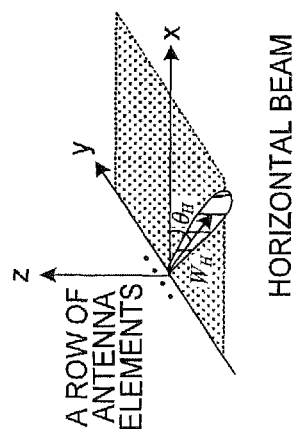

A horizontal beam can be formed by pre-coding a plurality of horizontal antenna elements placed in the horizontal domain (or a horizontal antenna element sequence (the antenna elements to constitute one row in FIG. 6)) using a horizontal precoder ($W_H$). For example, as shown in FIG. 7A, a horizontal beam is formed to have an angle $\theta_H$ in the horizontal domain, based on a horizontal precoder ($W_H$).

A vertical beam can be formed by pre-coding a plurality of vertical antenna elements placed in the vertical domain (or a vertical antenna element sequence (the antenna elements to constitute one column in FIG. 6)) using a vertical precoder ($W_V$). For example, as shown in FIG. 7B, a vertical beam is formed to have an angle $\theta_V$ in the vertical domain, based on a vertical precoder ($W_V$). Also, a plurality of vertical antenna elements or a vertical antenna element sequence may be configured to have the same polarized elements in the vertical domain (or in the vertical direction).

A 3D beam can be formed using a plurality of antenna elements that are placed along the horizontal direction and the horizontal direction, by combining a horizontal precoder ($W_H$) and a vertical precoder ($W_V$). For example, as shown in FIG. 7C, a 3D beam can be formed by combining the horizontal beam of FIG. 7A and the vertical beam of FIG. 7B.

Figure 8:
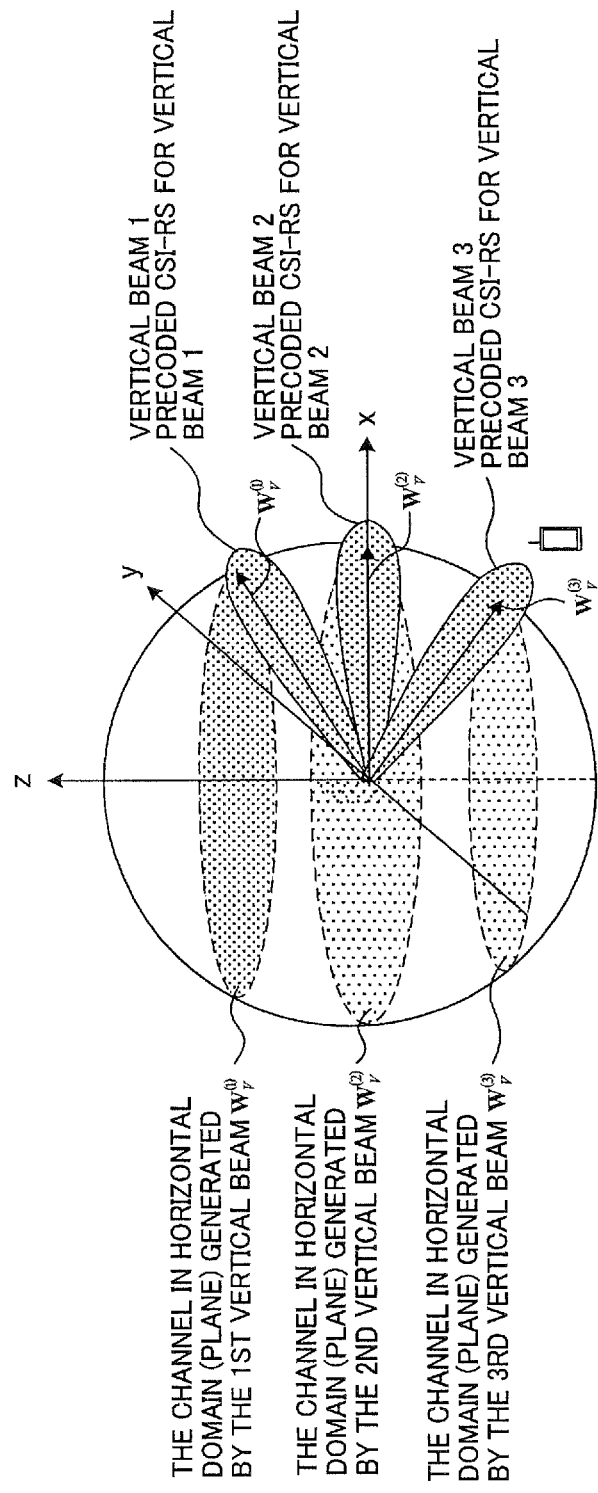
FIG. 8 is a diagram to explain horizontal domain channels produced by a plurality of vertical beams.

Given the situation where three vertical beams are formed, FIG. 8 shows the horizontal domain channels (horizontal channels) produced by each vertical beam. To be more specific, in FIG. 8, the channels in the horizontal domain that are produced by the vertical beam 1, the vertical beam 2 and the vertical beam 3, respectively, are shown. As noted earlier, the vertical beams 1 to 3 are formed by pre-coding vertical antenna elements (vertical antenna element sequence) using vertical precoders ($W_v^{(1)}$, $W_v^{(2)}$ and $W_v^{(3)}$), respectively.

In downlink communication such as described above in which 3D beams are used, a study is in progress to pre-code measurement reference signals that respectively correspond to a plurality of vertical beams, using different precoding weights between these plurality of vertical beams, and map these plurality of measurement reference signals to the same radio resources (for example, to resource elements of the same antenna port), so that it is possible to prevent the overhead of measurement reference signals from increasing. Consequently, realization of a CSI feedback scheme that is based on a plurality of pre-coded measurement reference signals is awaited.

So, the present inventors have studied a radio communication method that makes it possible to feed back CSI based on a plurality of measurement reference signals that are pre-coded using different precoding weights between a plurality of vertical beams, in downlink communication in which 3D beams formed with horizontal beams and vertical beams are used, and arrived at the present invention.

With the radio communication method according to the present embodiment, the radio base station eNB transmits a plurality of measurement reference signals that are pre-coded using different precoding weights between a plurality of vertical beams. Also, a user terminal UE transmits channel state information (CSI) that is generated based on the above plurality of measurement reference signals, to the radio base station eNB. Based on this CSI, the radio base station eNB selects the precoding weights to form the vertical beams that are used in downlink communication with the user terminal UE.

Note that, although, with the radio communication method according to the present embodiment, a plurality of measurement reference signals are pre-coded using different precoding weights between a plurality of vertical beams and mapped to the same radio resources, this is by no means limiting. For example, it is equally possible to pre-code a plurality of measurement reference signals using different precoding weights between a plurality of horizontal beams and map the reference signals to the same radio resources. That is, the relationship between vertical beams and horizontal beams may be switched whenever appropriate.

Also, although the radio communication method according to the present embodiment uses, for example, CSI-RSs and CRSs as measurement reference signals, this is by no means limiting.

First Embodiment

With the first embodiment, a case will be described where CSI-RS are used as measurement reference signals. With the first embodiment, a plurality of CSI-RSs that are pre-coded with different precoding weights per vertical beam are mapped to different CSI-RS resources per vertical beam. Each CSI-RS resource is associated with one vertical beam. By this means, CSI that is fed back with respect to each CSI-RS resource represents the CSI of vertical beams, which are associated with each CSI-RS resource, in the horizontal domain. Also, each CSI-RS resource is associated with one CSI process.

Here, CSI-RS resources refer to radio resources that are determined in advance for the mapping of CSI-RSs. For example, as shown in FIG. 2, CSI-RS resources are formed with a predetermined number of resource elements (REs) that are determined per antenna port. Also, CSI-RS resources have a plurality of arrangement patterns (CSI configurations).

Note that, in Rel-11 CoMP, each CSI-RS resource is associated with one CoMP cell, and furthermore corresponds to one CSI process. In this way, by associating a CSI-RS resource that is associated with one CoMP cell with one vertical beam, it is possible to re-use the CSI feedback configuration in Rel-11 CoMP in the CSI feedback configuration in 3D beam forming.

Example 1.1

The radio communication method according to a first example of the first embodiment (hereinafter referred to as "example 1.1") will be described with reference to FIG. 9. Note that, in FIG. 9, K≥1) vertical beams are configured. Also, the K vertical beams correspond to K CSI processes, respectively.

Figure 9:
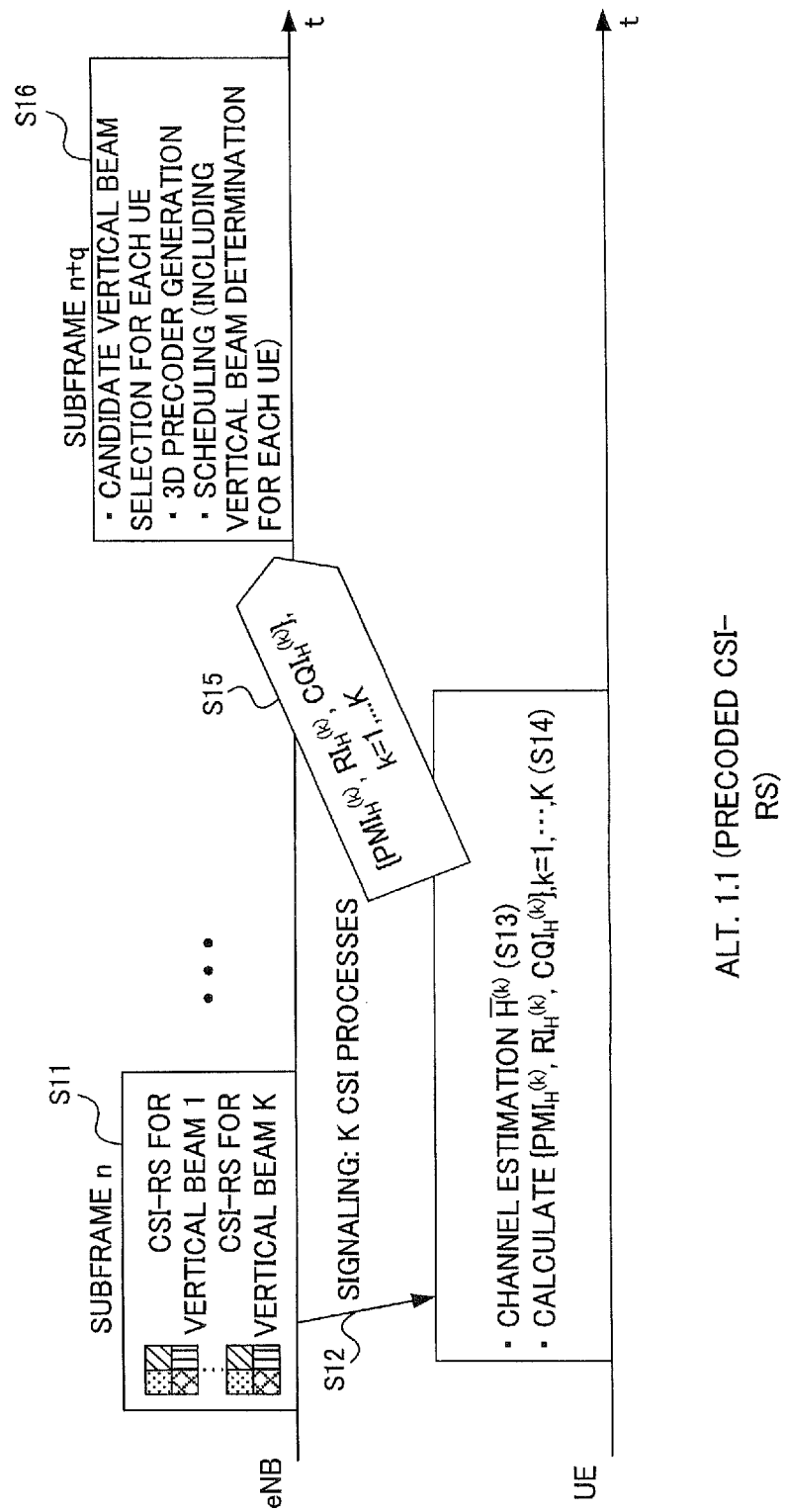
FIG. 9 is a diagram to explain a radio communication method according to example 1.1 of the present embodiment.

As shown in FIG. 9, a radio base station eNB pre-codes CSI-RSs using different precoding weights per vertical beam, maps the pre-coded CSI-RSs to different CSI-RS resources per vertical beam, and transmits them (step S11). Note that the CSI-RS resources of each vertical beam may be placed in the same subframe n or may be placed in different subframes, as shown in FIG. 9.

Also, the radio base station eNB reports CSI process information to a user terminal UE (step S12). Here, the CSI process information is information related to the K CSI processes to which the K vertical beams correspond respectively, and is, for example, the number of CSI-RS processes and the corresponding to antenna ports. The CSI process information is reported by, for example, higher layer signaling such as RRC signaling.

The user terminal UE performs channel estimation of each vertical beam (CSI process) (step S13). To be more specific, in FIG. 9, the user terminal UE estimates the horizontal channels formed by each vertical beam:

$$\overline{H}^{(k)} \ (k=1, \ldots, K) \qquad \text{[Formula 1]}$$

A horizontal channel refers to a 2D channel in the horizontal domain that is formed by a vertical beam.

The user terminal UE calculates CSI for each vertical beam (CSI process) based on the results of channel estimation (step S14). To be more specific, the user terminal UE calculates the $PMI_H^{(k)}$'s, $RI_H^{(k)}$'s and $CQI_H^{(k)}$'s (k=1 . . . , K) of the K horizontal channels formed respectively by the K vertical beams. Here, the $PMI_H^{(k)}$ is the precoding matrix indicator of the horizontal channel formed by the k-th vertical beam, and identifies the precoding weight used in the horizontal channel. Also, the $RI_H^{(k)}$ is the rank indicator of the horizontal channel formed by the k-th vertical beam. Furthermore, the $CQI_H^{(k)}$ is the channel quality indicator of the horizontal channel formed by the k-th vertical beam.

The user terminal UE feeds back the CSIs of all vertical beams (CSI processes) to the radio base station eNB (step S15). To be more specific, the user terminal UE feeds back the $PMI_H^{(k)}$'s, $RI_H^{(k)}$'s and $CQI_H^{(k)}$'s (k=1, . . . , K) of the K horizontal channels formed respectively by the K vertical beams. Note that the CSIs may be fed back in different subframes per vertical beam, or the CSIs of a plurality of vertical beams may be fed back in the same subframe.

Based on the CSIs of all vertical beams (CSI processes) that are fed back, the radio base station eNB selects the vertical beams to use in downlink MIMO transmission, and carries out scheduling and precoding (step S16). To be more specific, the radio base station eNB selects $PMI_v$'s using K $CQI^{(1)}, \ldots, CQI^{(K)}$ using a predetermined function (for example, argmax). Here, the $PMI_v$ is a vertical precoding matrix indicator for forming a vertical beam, and identifies the precoding weight that is used in a vertical precoder.

With the radio communication method according to example 1.1, K vertical beams are associated with K CSI processes, respectively, and the CSIs of all of the K vertical beams (CSI process) are fed back. In Rel-11 CoMP, a plurality of CSI processes that are associated with a plurality of CoMP cells, respectively, are defined. Consequently, by associating a plurality of CSI processes with a plurality of vertical beams, respectively, instead of a plurality of CoMP cells, it is possible to reduce the load of system implementation, and realize a CSI feedback configuration in 3D beam forming. Also, it is possible to secure backward compatibility with user terminals UE (legacy terminals) that support up to Rel-11.

Example 1.2

The radio communication method according to a second example of the first embodiment (hereinafter referred to as "example 1.2") will be described with reference to FIG. 10. Note that, in FIG. 10, K (K≥1) vertical beams are configured. Also, the K vertical beams correspond to K CSI processes, respectively. Note that each CSI process is identified by a CSI process identifier (CSI process ID).

Figure 10:
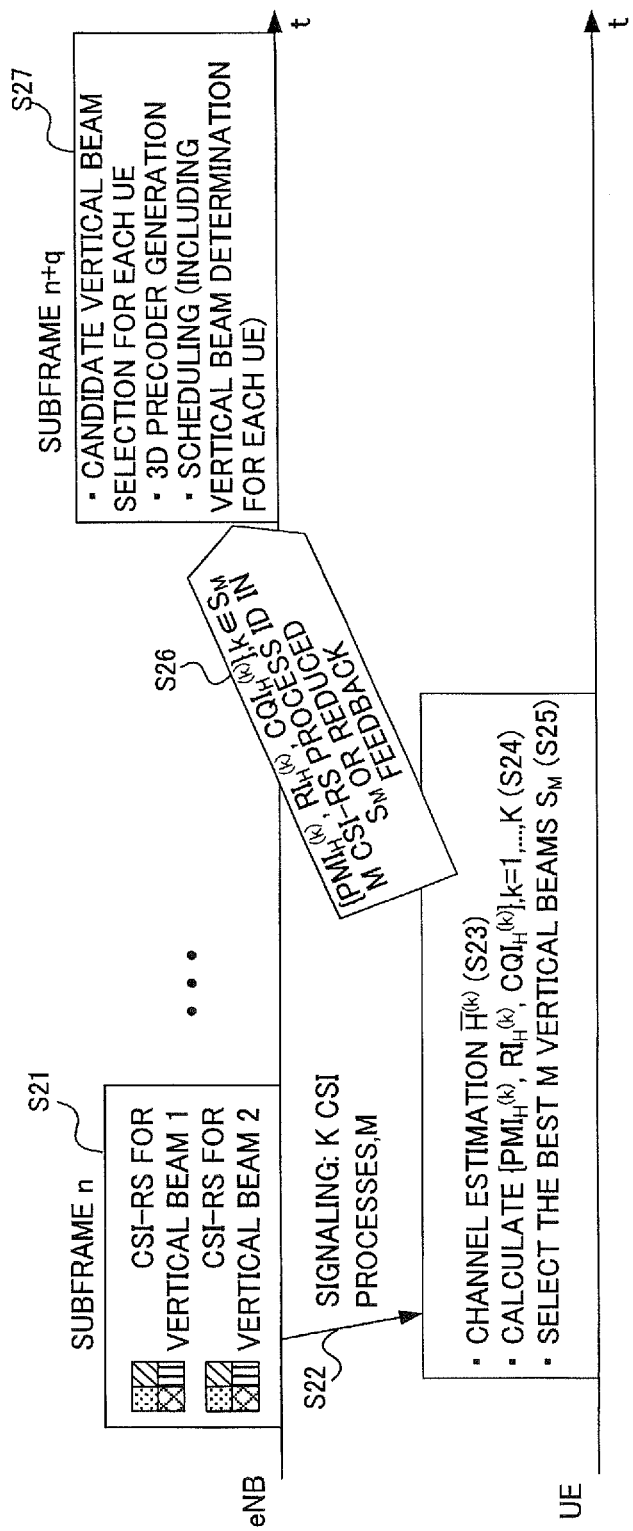
FIG. 10 is a diagram to explain a radio communication method according to example 1.2 of the present embodiment.

Steps S21, S23 and S24 in FIG. 10 are the same as steps S11, S13 and S14 in FIG. 9, and therefore will not be described. In step S22 of FIG. 10, the radio base station eNB reports the number of vertical beams M (M≥1) that require CSI feedback, in addition to the CSI process information described with step S12 of FIG. 9, to the user terminal UE. Here, the number M is reported by, for example, higher layer signaling such as RRC signaling. Note that the number M is configured in the user terminal UE in advance, the number M needs not be reported.

The user terminal UE selects the CSIs of the best M vertical beams from the CSIs of K vertical beams (CSI processes) calculated in step S24 (step S25). To be more specific, the user terminal UE measures the received quality of each CSI-RS of the K vertical beams, and selects the CSIs of M vertical beams where good received quality is measured. Here, the RSRP (Reference Signal Received Power) is used as the received quality of the CSI-RSs, but it is equally possible to use the RSRQ (Reference Signal Received Quality), the SINR (Signal Interference plus Noise Ratio) and so on.

Note that, in step S25, the user terminal UE may select the CSIs of M best vertical beams, in which the horizontal channels formed by the vertical beams show good $CQI_H$'s. Also, the user terminal UE may select the CSIs of M vertical beams, in which the capacity in the sectors formed by the vertical beams is sufficient.

The user terminal UE feeds back the CSIs of M vertical beams (CSI processes) that are selected, and the CSI process IDs that identify the M CSI processes to the radio base station eNB (step S26). To be more specific, the user terminal UE feeds back the $PMI_H^{(k)}$'s, $RI_H^{(k)}$'s and $CQI_H^{(k)}$'s ($k \in S_M$) of M horizontal channels that are formed by the M selected vertical beams respectively.

Based on the CSIs of the M vertical beams (CSI processes) that are fed back, the radio base station eNB selects the vertical beams to use in downlink MIMO transmission, and carries out scheduling and precoding (step S27).

With the radio communication method according to example 1.2, the CSIs of M vertical beams selected from the CSIs of K vertical beams (CSI processes) are fed back. Consequently, compared to the case where the CSIs of all of the K vertical beams are fed back (example 1.1), it is possible to reduce the overhead due to CSI feedback.

Note that, with the radio communication method according to example 1.2, it is possible to further reduce the overhead due to CSI feedback by utilizing the characteristics of 3D beams. To be more specific, in step S26, the user terminal UE may perform joint selection with respect to the $PMI_H$'s/$RI_H$'s of horizontal channels formed respectively by neighboring vertical beams (CSI processes). Here, joint selection means selecting the $PMI_H$/$RI_H$ of a horizontal channel that is optimal for multiple neighboring vertical beams. In this case, it is possible to reduce the overhead compared to the case of feeding back M $PMI_H$'s/$RI_H$'s.

Also, in step S26, the user terminal UE may select the differential values of the $CQI_H$'s of horizontal channels formed by neighboring vertical beams (CSI processes). In this case, once one $CQI_H$ (for example, the $CQI_H$ of the best vertical beam) is fed back, only the differential values need to be fed back with respect to the other M−1 $CQI_H$'s. Consequently, it is possible to reduce the overhead compared to the case of feeding back M $CQI_H$'s.

Also, in step S26, the user terminal UE may feed back the CSI of the best vertical beam (CSI process), the CSI of at least one vertical beam that neighbors the best vertical beam and the CSI process ID corresponding to that best vertical beam. In this case, only one CSI process ID is fed back, so that it is possible to reduce the overhead compared to the case of feeding back M CSI process IDs.

Example 1.3

The radio communication method according to a third example of the first embodiment (hereinafter referred to as "example 1.3") will be described with reference to FIG. 11. Note that, in FIG. 11, K (K≥1) vertical beams are configured. Also, the K vertical beams correspond to K CSI processes respectively. Note that each CSI process is identified by a CSI process ID.

Figure 11:
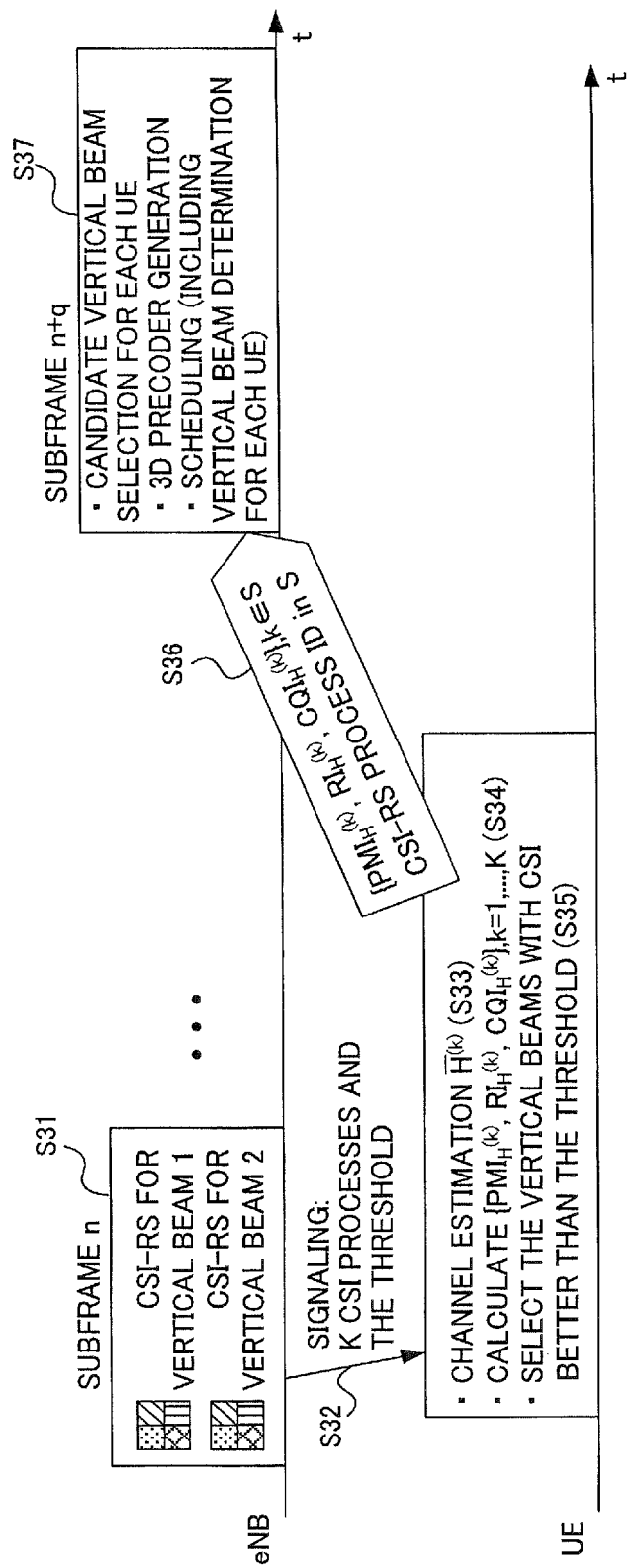
FIG. 11 is a diagram to explain a radio communication method according to example 1.3 of the present embodiment.

Steps S31, S33 and S34 of FIG. 11 are the same as steps S11, S13 and S14 of FIG. 9, and therefore will not be described. In step S32 of FIG. 11, the radio base station eNB reports a predetermined threshold value for CSIs that require CSI feedback, to the user terminal UE, in addition to the CSI process information described with reference to step S12 of FIG. 9. The predetermined threshold value may be reported by, for example, higher layer signaling such as RRC signaling. Also, when the predetermined threshold value is configured in the user terminal UE in advance, the predetermined threshold value needs not be reported.

The user terminal UE selects the CSIs of vertical beams having better CSIs than a predetermined threshold value (step S35), from the CSIs of the K vertical beams (CSI processes) calculated in step S34. To be more specific, the user terminal UE measure the received quality of each CSI-RS of the K vertical beams, and selects the CSIs of vertical beams where better received quality than a predetermined threshold value is measured. As has been described above, the RSRP is used as the received quality of the CSI-RSs, but it is equally possible to use the RSRQ, the SINR and so on.

Note that, in step S35, the user terminal UE may select the CSIs of M vertical beams, in which the horizontal channels formed by the vertical beams show better $CQI_H$'s than a predetermined threshold value. Also, the user terminal UE may select the CSIs of vertical beams, in which the capacity in the sectors formed by the vertical beams fulfills a predetermined threshold value.

The user terminal UE may feed back the CSIs of the selected vertical beams (CSI processes), and the CSI process IDs that identify the selected CSI processes, to the radio base station eNB (step S36). To be more specific, the user terminal UE feeds back the $PMI_H^{(k)}$'s, $RI_H^{(k)}$'s and $CQI_H^{(k)}$'s (k∈S) of the horizontal channels formed by the selected vertical beams.

Based on the CSIs of the M vertical beams (CSI processes) that are fed back, the radio base station eNB selects the vertical beams to use in downlink MIMO transmission, and carries out scheduling and precoding (step S37).

With the radio communication method according to example 1.3, among the CSIs of K vertical beams (CSI processes), only the CSIs of vertical beams that are better than a predetermined threshold value are fed back. Consequently, it is possible to reduce the overhead due to CSI feedback compared to the case of feeding back the CSIs of all of the K vertical beams (example 1.1).

Second Embodiment

Cases will be described with a second embodiment where CRSs are used as measurement reference signals. With the second embodiment, a plurality of CRSs that are pre-coded with different precoding weights per vertical beam are transmitted in different subframes per vertical beam. Each subframe is associated with one vertical beam. By this means, CSI that is fed back with respect to each CSI-RS resource represents the CSI of vertical beams, which are associated with each CSI-RS resource, in the horizontal domain.

Example 2.1

The radio communication method according to a first example of the second embodiment (hereinafter referred to as "example 2.1") will be described with reference to FIG. 12. Note that, in FIG. 12, K vertical beams are configured.

Figure 12:
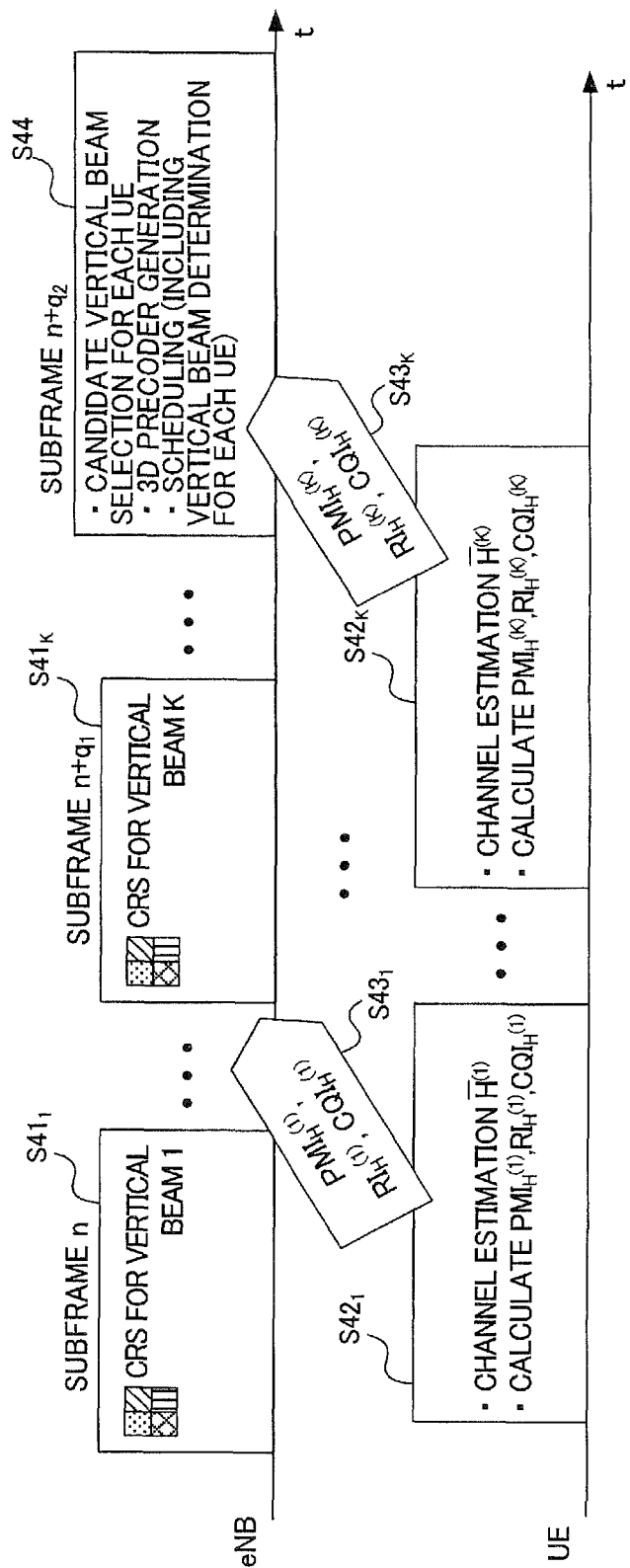
FIG. 12 is a diagram to explain a radio communication method according to example 2.1 of the present embodiment.

As shown in FIG. 12, the radio base station eNB pre-codes CRSs using different precoding weights per vertical beam, and transmits the pre-coded CRSs in different subframes per vertical beam (step S41). For example, in FIG. 12, the CRS that is pre-coded with the precoding weight corresponding to the first vertical beam is transmitted in subframe n (step S41₁). Also, the CRS that is pre-coded with the precoding weight corresponding to the k-th vertical beam is transmitted in subframe n+q₁ (step S41ₖ).

The user terminal UE performs channel estimation of each vertical beam, and calculate the CSI of each vertical beam based on the results of channel estimation (step S42). To be more specific, in FIG. 12, the user terminal UE estimates the horizontal channel formed by the first vertical beam $$\overline{H}^{(1)} \qquad \text{[Formula 2]}$$

based on the CRS that is pre-coded with the precoding weight corresponding to the first vertical beam, and calculates the $PMI_H^{(1)}$, $RI_H^{(1)}$, and $CQI_H^{(1)}$ of that horizontal channel (step S42₁). Similarly, based on the CRS that is pre-coded with the precoding weight corresponding to the k-th vertical beam, the horizontal channel formed by the K-th vertical beam $$\overline{H}^{(K)} \qquad \text{[Formula 3]}$$

is estimated, and the $PMI_H^{(K)}$, $RI_H^{(K)}$, and $CQI_H^{(K)}$ of that horizontal channel are calculated (step S42ₖ).

The user terminal UE feeds back the CSIs of all vertical beams to the radio base station eNB (step S43). To be more specific, the user terminal UE feeds back the $PMI_H^{(k)}$'s, $RI_H^{(k)}$'s and $CQI_H^{(k)}$'s (k∈1, . . . , K), calculated in steps S42₁ S42ₖ, respectively, in continuous subframes, separately (step S43₁ to S43ₖ).

Based on the CSIs of all vertical beams that are fed back, the radio base station eNB selects the vertical beams to use in downlink MIMO transmission, and carries out scheduling and precoding (step S44). To be more specific, the radio base station eNB selects $PMI_v$'s using K $CQI^{(1)}, \ldots, CQI^{(K)}$ using a predetermined function (for example, argmax).

With the radio communication method according to example 2.1, K vertical beams are associated respectively with the CRSs of K subframes, and the CSIs of all of the K vertical beams are fed back. In this way, by using a CSI feedback configuration based on CRSs, it is possible to reduce the load of system implementation and realize a CSI feedback configuration in 3D beam forming. Also, it is possible to secure backward compatibility with user terminals UE (legacy terminals) that support CSI feedback based on CRSs yet do not support CSI feedback based on CSI-RSs.

Example 2.2

The radio communication method according to a second example of the second embodiment (hereinafter referred to as "example 2.2") will be described with reference to FIG. 13. Note that, in FIG. 13, K vertical beams are configured.

Figure 13:
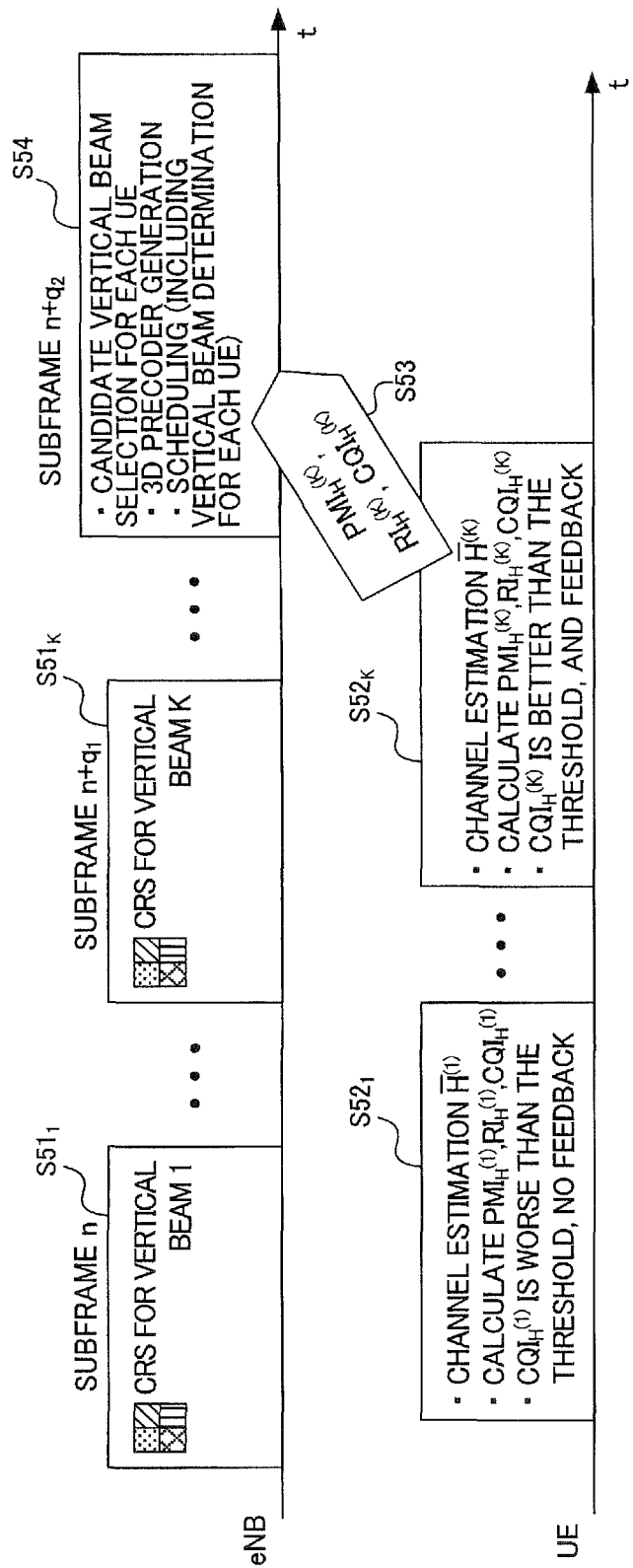
FIG. 13 is a diagram to explain radio communication method according to example 2.2 of the present embodiment.

Steps $S51_1$ to $S51_K$ in FIG. 13 are the same as steps $S41_1$ to $S41_K$ in FIG. 12, and therefore will not be described. Note that, although not illustrated, the radio base station eNB reports a predetermined threshold value for CSIs that require CSI feedback, to the user terminal UE. The predetermined threshold value may be reported by, for example, higher layer signaling such as RRC signaling. Also, when the predetermined threshold value is configured in the user terminal UE in advance, the predetermined threshold value needs not be reported.

The user terminal UE performs channel estimation of each vertical beam, calculate the CSI of each vertical beam based on the results of channel estimation, and determines whether the calculated CSIs are better than a predetermined threshold value (step S52). For example, in FIG. 13, the $PMI_H^{(1)}$, $RI_H^{(1)}$ and $CQI_H^{(1)}$ of the horizontal channel formed by the first vertical beam are calculated, and whether or not this calculated $CQI_H^{(1)}$ is better than a predetermined threshold value is determined (step $S52_1$). Here, the $CQI_H^{(1)}$ that is calculated is poorer than the predetermined threshold value, so that the CSI of the first vertical beam is not fed back.

Similarly, in FIG. 13, the $PMI_H^{(K)}$, $RI_H^{(K)}$ and $CQI_H^{(K)}$ of the horizontal channel formed by the K-th vertical beam are calculated, whether or not the $CQI_H^{(K)}$ that is calculated is better than a predetermined threshold value is determined (step $S52_1$). Here, the $CQI_H^{(K)}$ that is calculated is better than the predetermined threshold value, so that the CSI of the K-th vertical beam is fed back. To be more specific, the user terminal UE feeds back the $PMI_H^{(K)}$, $RI_H^{(K)}$, and $CQI_H^{(K)}$ that are calculated, to the radio base station eNB (step S53).

Based on the CSIs of the vertical beams that are fed back, the radio base station eNB selects the vertical beams to use in downlink MIMO transmission, and carries out scheduling and precoding (step S54).

With the radio communication method according to example 2.2, only the CSIs of vertical beams that are better than a predetermined threshold value, among the CSIs calculated based on the CRSs of K vertical beams, are fed back. Consequently, it is possible to reduce the overhead due to CSI feedback, compared to the case of feeding back the CSIs of all of the K vertical beams (example 2.1).

(Configuration of Radio Communication System)

Now, a radio communication system according to the present embodiment will be described in detail.

Figure 14:
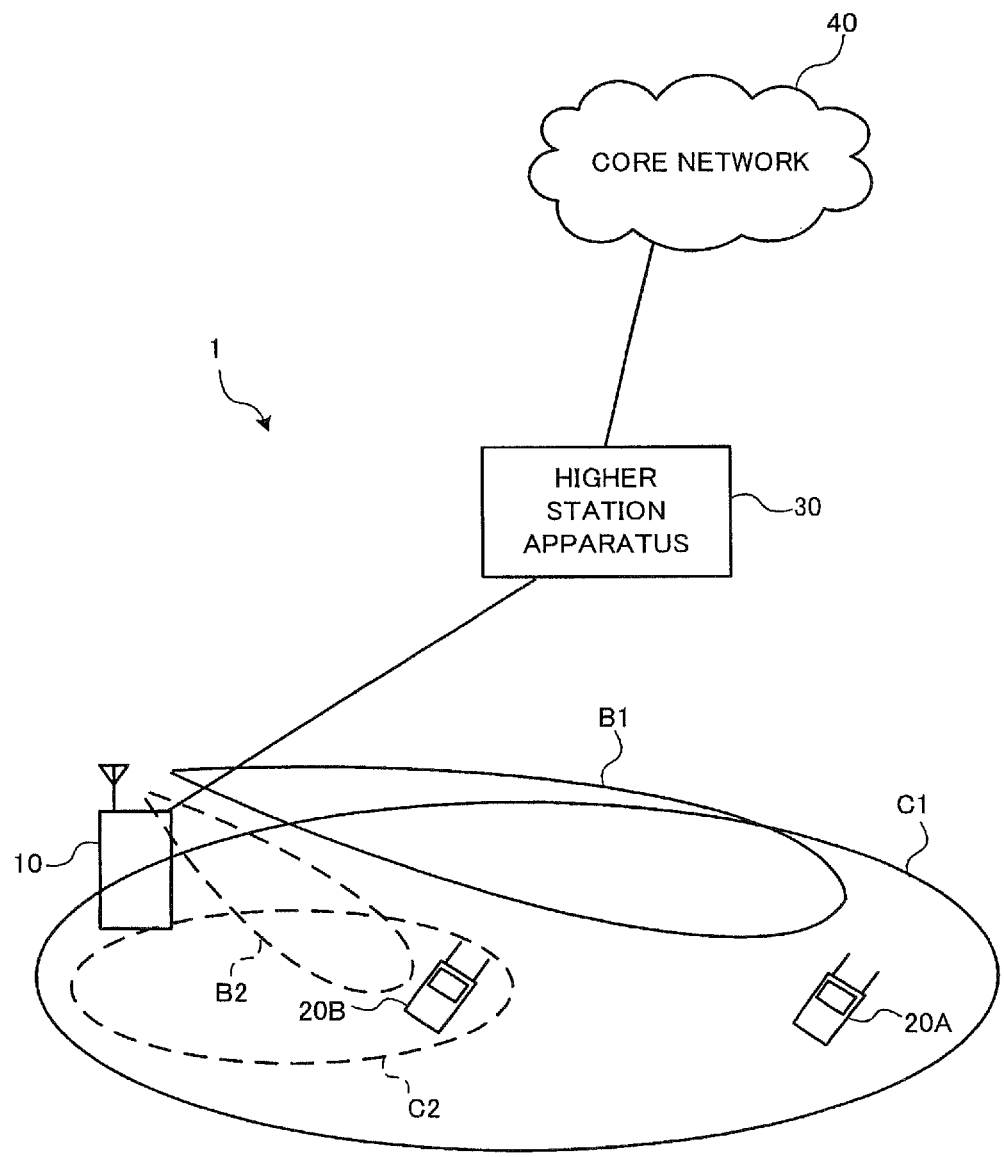
FIG. 14 is a diagram to explain a system structure of a radio communication system according to the present embodiment.

FIG. 14 is a diagram to explain a system configuration of a radio communication system according to the present embodiment. Note that the radio communication system 1 shown in FIG. 14 is a system to accommodate, for example, the LTE system or SUPER 3G. This radio communication system may execute carrier aggregation, whereby a plurality of component carriers, which are the system band of the LTE system, are aggregated. Also, this radio communication system may be referred to as LTE-advanced (LTE-A), IMT-advanced, 4G and so on.

As shown in FIG. 14, the radio communication system 1 is configured to include a radio base station 10 and user terminals 20A and 20B that communicate with the radio base station 10. The radio base station 10 is connected with a higher station apparatus 30, and this higher station apparatus 30 is connected with a core network 40. The higher station apparatus 30 may be, for example, a gateway (GW), a mobility management entity (MME) and so on, but is by no means limited to this.

As shown in FIG. 14, the radio base station 10 outputs 3D beams B1 and B2 that are formed by combining a horizontal beam having horizontal directivity and a vertical beam having vertical directivity. In FIG. 14, a plurality of 3D beams B1 and B2, having varying directivities in the vertical direction, form a plurality of sectors (an inner cell C2 and an outer cell C1). To be more specific, the 3D beam B1 having a small tilt angle forms the outer cell C1 that is distant from the radio base station 10. Meanwhile, the 3D beam B2 having a large tilt angle forms the inner cell C2 that is near the radio base station 10. Note that the tilt angle is the angle of beams with respect to the horizontal direction (for example, the ground).

In FIG. 14, the user terminal 20A that is located in the outer cell C1 carries out downlink communication with the radio base station 10 using the 3D beam B1. Also, the user terminal 20B located in the inner cell C2 carries out downlink communication with the radio base station 10 using the 3D beam B2. MIMO transmission is used in this downlink communication. The user terminals 20A and 20B may be either LTE terminals or LTE-A terminals, as long as they are user equipment (UE), which covers both mobile terminals and fixed terminals. The user terminals 20A and 20B hereinafter will be referred to as "user terminal 20," unless specified otherwise.

Note that, for radio access schemes in the radio communication system 1 shown in FIG. 14, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this.

Downlink communication channels include a PDSCH (Physical Downlink Shared Channel), which is shared between the user terminals 20 as a downlink data channel, and downlink L1/L2 control channels (PDCCH, PCFICH and PHICH). Transmission data and higher control information are transmitted by the PDSCH. Scheduling information (DL grants and UL grants) for the PDSCH and the PUSCH, and so on are transmitted by the PDCCH (Physical Downlink Control CHannel). Note that an enhanced PDCCH (also referred to as "E-PDCCH," "ePDCCH," "UE-PDCCH" and so on) that is frequency-division-multiplexed with the PDSCH may be provided to solve the shortage of capacity with the PDCCH.

Uplink communication channels include a PUSCH (Physical Uplink Shared Channel), which is shared between the user terminals 20 as an uplink data channel, and a PUCCH (Physical Uplink Control Channel), which is an uplink control channel. By means of this PUSCH, transmission data and higher control information are transmitted. Also, downlink channel state information (CSI), delivery acknowledgment information (ACK/NACK/DTX) and so on are transmitted by the PUCCH. Note that the channel state information (CSI) and delivery acknowledgment information (ACK/NACK/DTX) may be transmitted by the PUSCH as well.

Next, overall configurations of the radio base station and user terminals according to the present embodiment will be described with reference to FIGS. 15 and 16.

Figure 15:
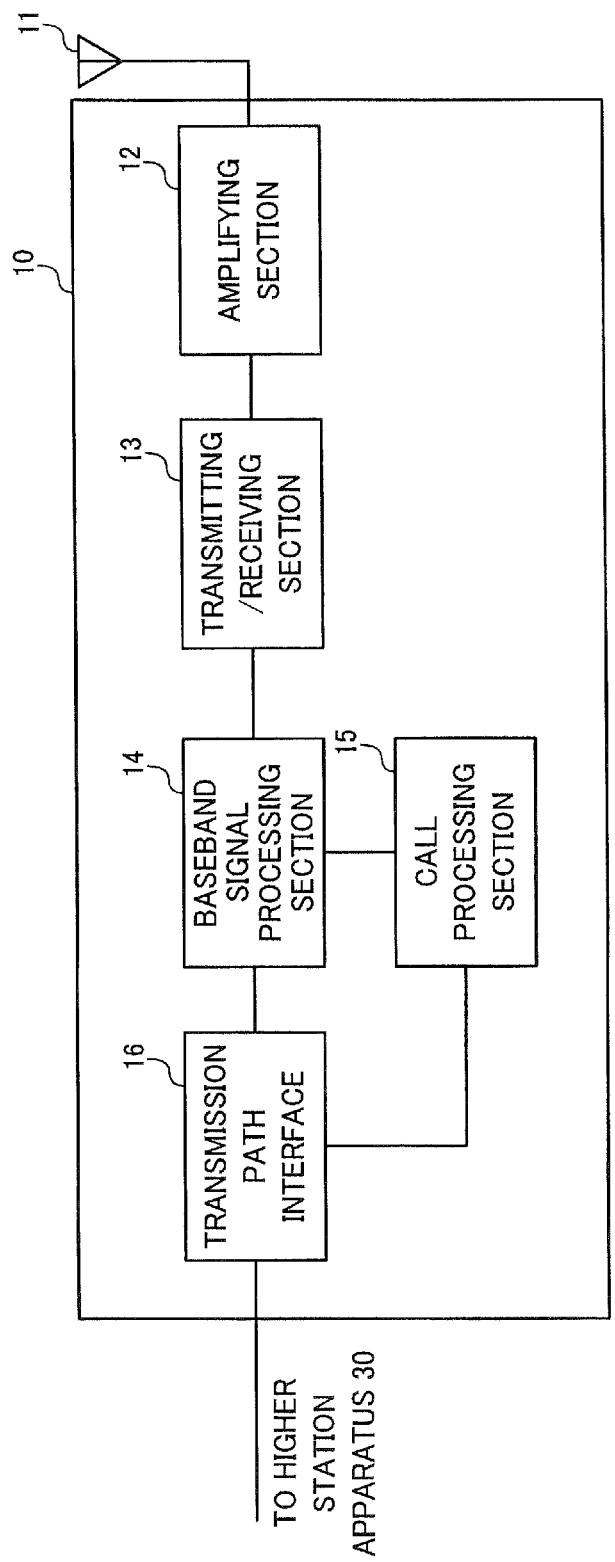
FIG. 15 is a diagram to explain an overall structure of a radio base station according to the present embodiment.
Figure 16:
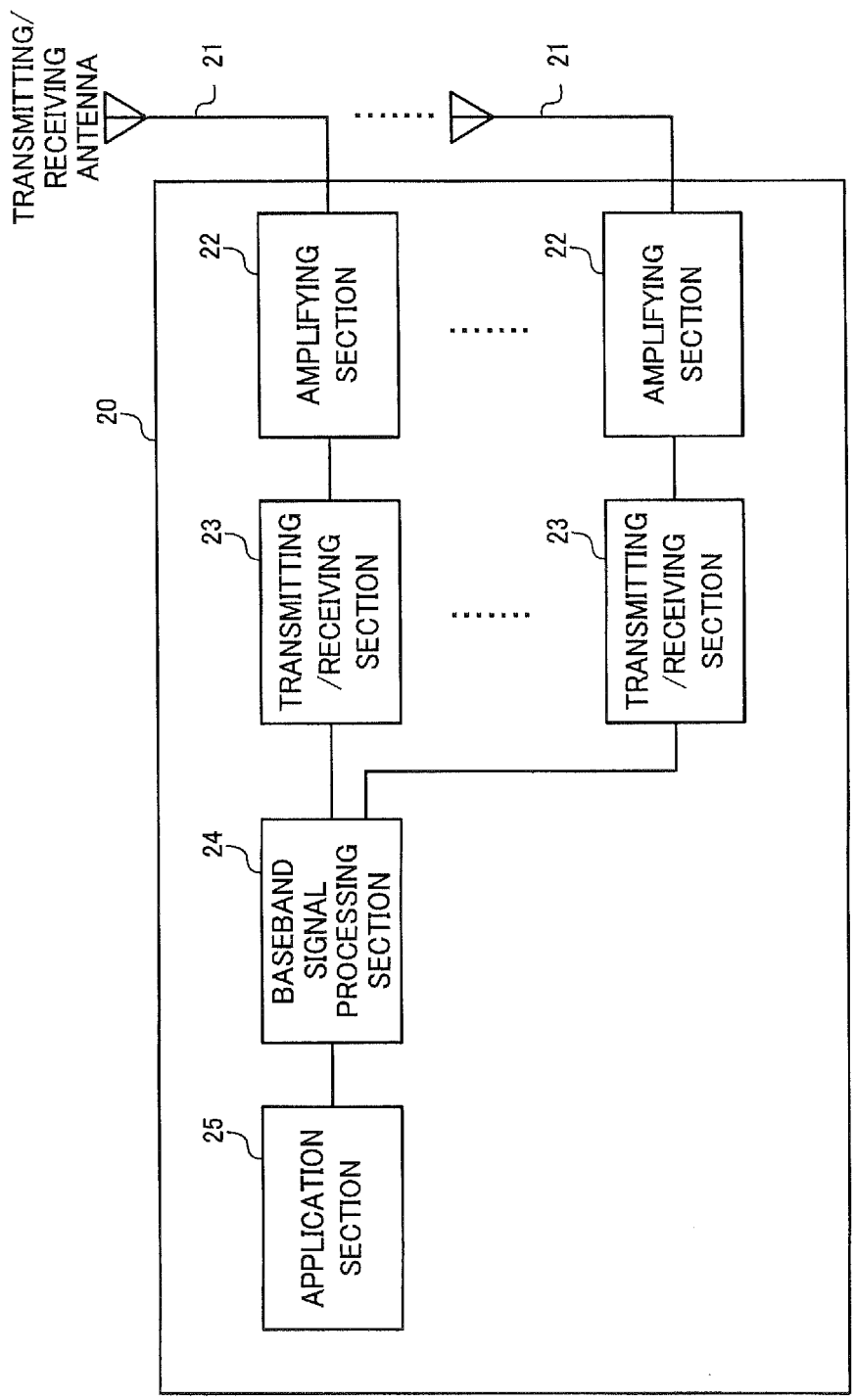
FIG. 16 is a diagram to explain an overall structure of a user terminal according to the present embodiment.

FIG. 15 is a diagram to show an overall configuration of the radio base station according to the present embodiment. As shown in FIG. 15, the radio base station 10 has a transmitting/receiving antenna 11, an amplifying section 12, a transmitting/receiving section 13, a baseband signal processing section 14, a call processing section 15, and a transmission path interface 16. Note that, as shown in FIG. 6, the transmitting/receiving antenna 11 is formed with a 3D antenna in which antenna elements are aligned in both the horizontal domain and the vertical domain. To be more specific, the transmitting/receiving antenna 11 has horizontal antenna element sequences that are each formed with a plurality of antenna elements and serve as horizontal beam forming units, and vertical antenna element sequences that are each formed with a plurality of antenna elements and serve as vertical beam forming units.

Downlink data for the user terminal 20 is input from the higher station apparatus 30, into the baseband signal processing section 14, via the transmission path interface 16. In the baseband signal processing section 14, signal transmission processes are executed with respect to the downlink data, including HARQ retransmission control, scheduling, transport format selection, channel coding, precoding, mapping to radio resources, an inverse fast Fourier transform (IFFT), and so on.

Also, in the baseband signal processing section 14, signal transmission processes are carried out also with respect to downlink control data (for example, DCI), including channel coding, mapping to radio resources, an IFFT and so on. Furthermore, for broadcast information provided by broadcast channels and reference signals (CRSs, CSI-RSs, DM-RSs and so on), too, signal transmission processes such as mapping to radio resources, an IFFT and so on are carried out.

The transmitting/receiving section 13 converts baseband signals, which are pre-coded and output from the baseband signal processing section 14 per antenna element (see FIG. 6) in the transmitting/receiving antenna 11, into a radio frequency band. The amplifying section 122 amplifies the radio frequency signals subjected to frequency conversion, and output the results through the transmitting/receiving antennas 111.

Meanwhile, as for uplink data from the user terminal 20, each radio frequency signal that is received in the transmitting/receiving antenna 11 is amplified in the amplifying section 12, and converted into a baseband signal through frequency conversion in the transmitting/receiving section 13, and input in the baseband signal processing section 14.

In the baseband signal processing section 14, the uplink data that is included in the input baseband signals is subjected to signal receiving processes such as a fast Fourier transform (FFT), an inverse discrete Fourier transform (IDFT) and error correction decoding, and transferred to the higher station apparatus 30 via the transmission path interface 16. The call processing section 15 performs call processing such as setting up and releasing communication channels, manages the state of the radio base station 10 and manages the radio resources.

Figure 18:
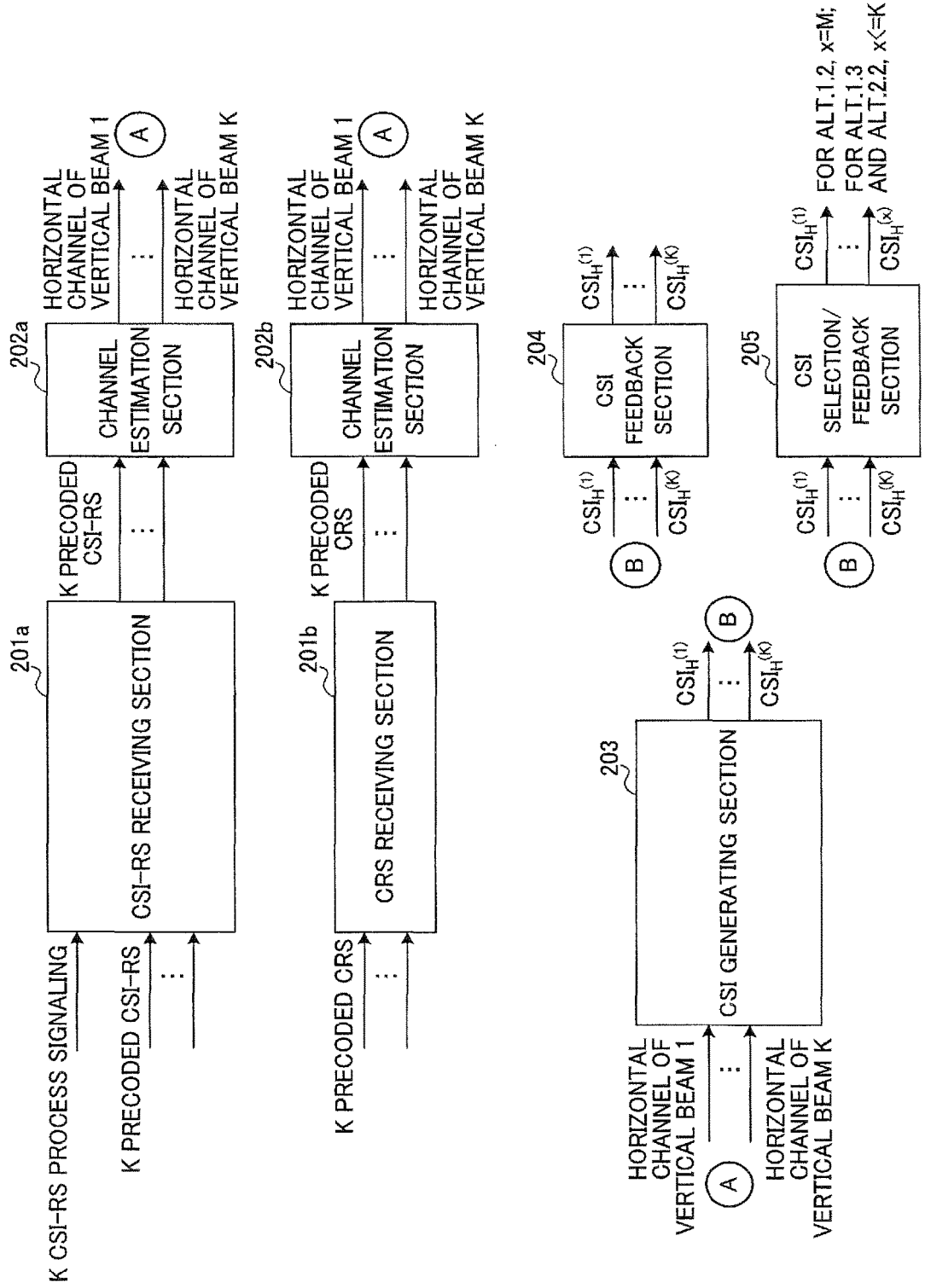
FIG. 18 is a diagram to explain functional configurations of a user terminal according to the present embodiment.

FIG. 18 is a diagram to show an overall configuration of a user terminal according to the present embodiment. As shown in FIG. 16, the user terminal 20 has a plurality of transmitting/receiving antennas 21, a plurality of amplifying sections 22, transmitting/receiving sections 23, a baseband signal processing section 24, and an application section 25.

As for downlink signals from the radio base station 10, radio frequency signals received in the transmitting/receiving antennas 21 are each amplified in the amplifying sections 22, and converted into baseband signals through frequency conversion in the transmitting/receiving sections 23. The baseband signals are subjected to signal receiving processes such as FFT and error correction decoding in the baseband signal processing section 24. In the downlink signals, downlink user data is transferred to the application section 25 and subjected to processes related to higher layers.

Meanwhile, uplink data for the radio base station 10 is input from the application section 25 into the baseband signal processing section 24. In the baseband signal processing section 24, signal transmission processes such as HARQ retransmission control, channel coding, precoding, a DFT and an IFFT are carried out, and the results are forwarded to each transmitting/receiving sections 23. The baseband signals output from the baseband signal processing section 24 are converted into a radio frequency band in the transmitting/receiving sections 23. After that, the radio frequency signals that have been subjected to frequency conversion are amplified in the amplifying sections 22 and transmitted from the transmitting/receiving antennas 21.

Figure 17:
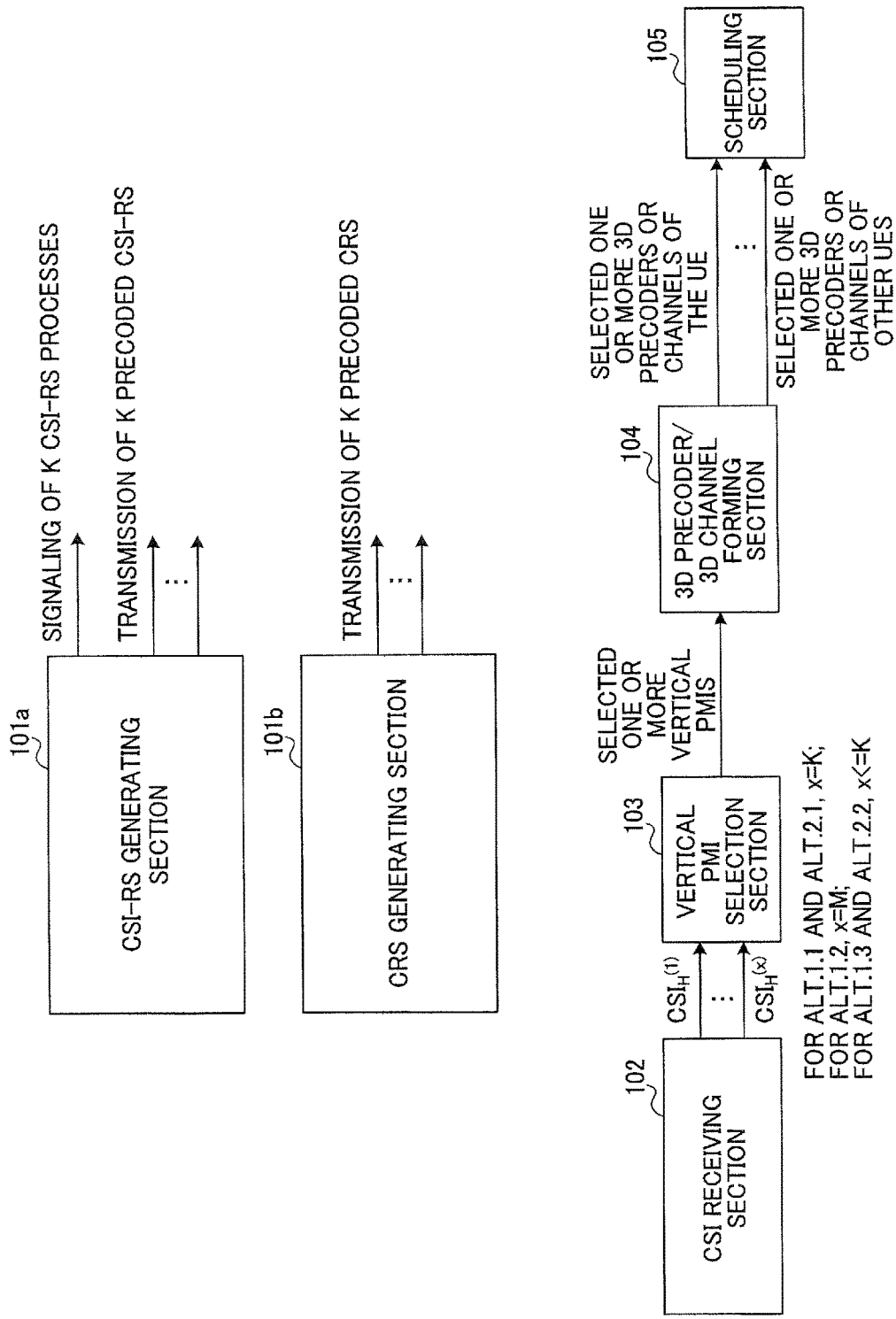
FIG. 17 is a diagram to explain functional configurations of a radio base station according to the present embodiment.

Next, the configurations of the radio base station and user terminal according to the present embodiment will be described in detail with reference to FIGS. 17 and 18. Note that, although FIG. 17 and FIG. 18 show functional configurations pertaining to CSI feedback, other functional configurations may be provided as well. Also, the functional configurations shown in FIG. 17 are primarily provided in the baseband signal processing section 14 of FIG. 15. Similarly, the functional configurations shown in FIG. 18 are primarily provided in the baseband signal processing section 24 of FIG. 16.

FIG. 17 is a diagram to show the functional configurations of a radio base station according to the present embodiment. As shown in FIG. 17, as functional configuration pertaining to CSI feedback, a radio base station 10 has a CSI-RS generating section 101*a* (example 1.1, example 1.2 and example 1.3), a CRS generating section 101*b* (example 2.1 and example 2.2), a CSI receiving section 102 (receiving section), a vertical PMI selection section 103 (selection section), a 3D precoder 104/3D channel forming section 104, and a scheduling section 105 (which determines UEs and the 3D precoders to use).

The CSI-RS generating section 101*a* pre-codes channel state measurement reference signals (CSI-RSs) using different precoding weights per vertical beam, and maps the pre-coded CSI-RSs to different CSI-RS resources per vertical beam.

To be more specific, the CSI-RS generating section 101*a* configures K CSI processes in association with K (K≥1) vertical beams, and outputs CSI process information related to the K CSI processes that are configured, and K pre-coded CSI-RSs. The CSI process information and K pre-coded CSI-RSs that are output from the CSI-RS generating section 101*a* are transmitted to the user terminal 20, through K CSI processes (processes), by a transmission section that is constituted with the transmitting/receiving section 13, the amplifying section 12 and the transmitting/receiving antenna 11 of FIG. 15.

Note that the K CSI processes each have corresponding CSI-RS resources, and the K pre-coded CST-RSs are mapped to CSI-RS resources that correspond respectively to K CSI processes.

The CRS generating section 101*b* pre-codes cell-specific reference signals (CRSs) using different precoding weights per vertical beam, and maps the pre-coded CSI-RSs to different subframes per vertical beam.

To be more specific, the CRS generating section 101*b* outputs the K pre-coded CRSs in association with K (K≥1) vertical beams. The K pre-coded CRSs output from the CRS generating section 101*b* are transmitted to the user terminal 20, in K subframes, by the transmission section constituted with the transmitting/receiving section 13, the amplifying section 12, and the transmitting/receiving antenna 11 of FIG. 15.

The CSI receiving section 102 receives channel state information ($CSI_H$'s) that is fed back from the user terminal 20. These $CSI_H$'s indicate the states of the horizontal domain channels (horizontal channels) formed by the vertical beams. The $CSI_H$'s include precoding matrix indicators ($PMI_H$'s) that identify the precoding weights of the horizontal channels, rank indicators ($RI_H$'s) that identify the ranks of the horizontal channels, and channel quality indicators ($CQI_H$'s) that identify the channel quality of the horizontal channels.

To be more specific, the CSI receiving section 102 may receive the $CSI_H^{(1)}$ . . . $CSI_H^{(x)}$ (x=K) of K horizontal channels formed by K (K≥1) vertical beams (example 1.1 and example 2.1). Also, the CSI receiving section 102 may receive the $CSI_H^{(1)}$ . . . $CSI_H^{(x)}$ (x=M) of M horizontal channels showing good channel states, selected from the K $CSI_H^{(1)}$ . . . $CSI_H^{(K)}$ (example 1.2). Also, the CSI receiving section 102 may receive $CSI_H^{(1)}$ . . . $CSI_H^{(x)}$ (x≤K) that show channel states better than a predetermined threshold value, selected from the K $CSI_H^{(1)}$ . . . $CSI_H^{(K)}$ (example 1.3 and example 2.2).

Based on the $CSI_H$'s input from the CSI receiving section 102, the vertical PMI selection section 103 selects the PMIs (vertical PMIs) for forming the vertical beams to use in downlink communication with the user terminal 20. To be more specific, the vertical PMI selection section 103 selects the vertical PMIs that indicate these precoding weights. The vertical PM's ($PMI_v$'s) are selected by using, for example, the $CQI_H^{(1)}$ . . . $CQI_H^{(x)}$ that are included in the $CSI_H^{(1)}$ . . . $CSI_H^{(x)}$, and a predetermined function (for example, argmax). Note that the vertical PMI selection section 103 constitutes a selection section that selects the PMIs (precoding weights) for forming one vertical beam or a plurality of vertical beams to be used in downlink communication.

The 3D precoder/3D channel forming section 104 carries out precoding by means of vertical precoders, using the vertical PMIs selected in the vertical PMI selection section 103, and forms vertical beams. Also, the 3D precoder/3D channel forming section 104 carries out precoding by means of horizontal precoders, and forms horizontal beams. The vertical beams and the horizontal beams that are formed constitute 3D channels. Note that the 3D precoder/3D channel forming section 104 constitutes a forming section that forms 3D precoding weights using the PMIs (precoding weights) for forming horizontal beams, corresponding to the vertical PMIs selected by the vertical PMI selection section 103.

The scheduling section 105 carries out scheduling based on input information from the 3D precoder/3D channel forming section 104.

FIG. 18 is a diagram to show the functional configurations of a user terminal according to the present embodiment. As shown in FIG. 18, as functional configurations pertaining to CSI feedback, a user terminal 20 has a CSI-RS receiving section 201a and a channel estimation section 202a (example 1.1, example 1.2 and example 1.3), a CRS receiving section 201b and a channel estimation section 202b (example 2.1 and example 2.2), a CSI generating section 203, a CSI feedback section 204 (example 1.1 and example 2.1), and a CSI selection/CSI feedback section 205 (example 1.2, example 1.3 and example 2.2).

The CSI-RS receiving section 201a receives channel state measurement reference signals (CSI-RSs) that are pre-coded using different precoding weights per vertical beam. To be more specific, the CSI-RS receiving section 201a carries out the receiving processes of K pre-coded CSI-RSs (demodulation, decoding and so on) based on CSI process information that relates to K CSI processes in association with K (K≥1) vertical beams.

The channel estimation section 202a performs channel estimation based on the CST-RSs received in the CSI-RS receiving section 201a. To be more specific, based on the K pre-coded CSI-RSs input from the CSI-RS receiving section 201a, the channel estimation section 202a estimates K channels in the horizontal domain (horizontal channels), which are formed respectively by the K vertical beams (CSI processes).

The CRS receiving section 201b receives cell-specific reference signals (CRSs) that are pre-coded using different precoding weights per vertical beam. To be more specific, the CRS receiving section 201b performs the receiving processes (demodulation, decoding and so on) of K pre-coded CRSs that are transmitted in K subframes respectively.

The channel estimation section 202b performs channel estimation based on the CRSs received in the CRS receiving section 201b. To be more specific, based on the K pre-coded CRSs input from the CRS receiving section 201b, the channel estimation section 202b estimates K horizontal channels, formed by the K vertical beams respectively. As has been described above, a horizontal channel is a 2D channel in the horizontal domain that is formed by a vertical beam.

The CSI generating section 203 generates channel state information (CSI) of the horizontal channels estimated in the channel estimation sections 202a and 202b. To be more specific, the CSI generating section 204 generates the $CSI_H^{(1)}$ . . . $CSI_H^{(K)}$ of the K horizontal channels that are formed by the K vertical beams respectively. Note that the $CSI_H^{(1)}$ . . . $CSI_H^{(K)}$ include the $PMI_H^{(1)}$ . . . $PMI_H^{(K)}$, the $RI_H^{(1)}$ . . . $RI_H^{(K)}$, and the $CQI_H(1)$ . . . $CQI_H^{(K)}$.

The CSI feedback section 204 performs the transmission processes (for example, coding, modulation and so on) of all CSIs generated in the CSI generating section 203 (example 1.1 and example 2.1). To be more specific, the CSI feedback section 204 carries out the transmission processes of the $CSI_H^{(1)}$ . . . $CSI_H^{(K)}$ of the K horizontal channels input from the CSI generating section 203 and outputs the results. The $CSI_H^{(1)}$ . . . $CSI_H^{(K)}$ of K horizontal channels that are output are transmitted to the radio base station 10 by a transmission section constituted with the transmitting/receiving sections 23, the amplifying sections 22, the transmitting/receiving antennas 21 of FIG. 16.

The CSI selection/feedback section 205 selects CSIs that fulfill predetermined conditions, from the CSIs generated in the CSI generating section 203, and carries out the transmission processes (for example, coding, modulation and so on) of the selected CSIs. To be more specific, the CSI selection/feedback section 205 may select M $CSI_H^{(1)}$ . . . $CSI_H^{(x)}$ (x=M) that show good channel states, from the $CSI_H^{(1)}$ . . . $CSI_H^{(K)}$ of K horizontal channels input from the CSI generating section 203 (example 1.2). Also, the CSI selection/feedback section 205 may select $CSI_H^{(1)}$ . . . $CSI_H^{(K)}$ (x≤K) that show better channel states than a predetermined threshold value, from among the $CSI_H^{(1)}$ . . . $CSI_H^{(K)}$ of K horizontal channels input from the CSI generating section 203 (example 1.3 and example 2.2). The $CSI_H^{(1)}$ . . . $CSI_H^{(x)}$ that are selected are transmitted to the radio base station 10 by a transmission section that is constituted with the transmitting/receiving sections 23, the amplifying sections 22 and the transmitting/receiving antennas 21 of FIG. 16.

The present invention is by no means limited to the above embodiments and can be implemented in various modifications. For example, it is possible to adequately change the number of carriers, the bandwidth of the carriers, the signaling method, the number of processing sections, the process steps and so on in the above description, without departing from the scope of the present invention. Besides, the present invention can be implemented with various changes, without departing from the scope of the present invention.

The disclosure of Japanese Patent Application No. 2012-197745, filed on Sep. 7, 2012, including the specification, drawings and abstract, is incorporated herein by reference in its entirety.

The invention claimed is:

1. A user terminal that receives one or more Channel State Information Reference Signals (CSI-RSs) from a base station, the user terminal comprising:
   a channel estimation section that performs measurement on a basis of one or more resources of the one or more CSI-RSs, each of the CSI-RSs being precoded by the base station with a corresponding precoding weight;
   a generating section that generates one or more Channel State Information (CSIs) on the basis of a result of the measurement; and
   a transmission section that transmits a selected CSI from the one or more CSIs,
   wherein the transmission section transmits a CSI-RS resource identifier that designates a CSI-RS resource of the one or more CSI-RSs corresponding to the selected CSI.

2. The user terminal according to claim 1, wherein the one or more resources of the one or more CSI-RSs are each associated with a CSI process.

3. A radio communication method for a user terminal, comprising:
   receiving one or more Channel State Information Reference Signals (CSI-RSs) from a base station;
   performing a measurement on a basis of one or more resources of the one or more CSI-RSs, each of the CSI-RSs being precoded by the base station with a corresponding precoding weight;
   generating one or more Channel State Information (CSIs) on the basis of a result of the measurement;
   transmitting a selected CSI from the one or more CSIs; and
   transmitting a CSI-RS resource identifier that designates a CSI-RS resource of the one or more CSI-RSs corresponding to the selected CSI.

* * * * *